(12) United States Patent
DeFranks

(10) Patent No.: US 9,158,141 B2
(45) Date of Patent: Oct. 13, 2015

(54) THERMALLY ACTIVATED MATTRESS COVER AND DISPLAY

(71) Applicant: DREAMWELL, LTD., Las Vegas, NV (US)

(72) Inventor: Michael S. DeFranks, Decatur, GA (US)

(73) Assignee: DREAMWELL, LTD., Las Vegas, NV (US)

(*) Notice: Subject to any disclaimer, the term of this patent is extended or adjusted under 35 U.S.C. 154(b) by 196 days.

(21) Appl. No.: 13/750,464

(22) Filed: Jan. 25, 2013

(65) Prior Publication Data

US 2014/0211113 A1    Jul. 31, 2014

(51) Int. Cl.
| | | |
|---|---|---|
| G02F 1/133 | (2006.01) | |
| G02F 1/13 | (2006.01) | |
| G01K 11/16 | (2006.01) | |
| A47C 21/04 | (2006.01) | |
| G02F 1/137 | (2006.01) | |

(52) U.S. Cl.
CPC .............. *G02F 1/132* (2013.01); *A47C 21/04* (2013.01); *G01K 11/165* (2013.01); *G01K 2207/00* (2013.01); *G02F 1/13718* (2013.01)

(58) Field of Classification Search
CPC . G02F 1/0147; G02F 1/132; G02F 1/133305; H01L 21/67115; H01L 21/67248; H01L 27/322; H01L 27/3232; H01L 51/529; A61B 2560/0242; A61B 2560/0252; A61B 18/14; A61B 18/12; A61B 2017/00084; A61B 5/015; A61N 2018/00809; A61N 2018/1869; A61N 2018/00702; A61N 2018/0072; A61N 2018/00767; A61N 2018/00714; A61N 2018/00791; A61N 2018/00797; A61F 2210/008; G01N 21/78; G01N 27/3274; G01N 2201/1211; G01K 13/00; G01K 13/002; G01K 11/165; G01K 1/02; G01K 2213/00; G01K 7/02; G02B 5/3016; G06F 1/20; F24J 2/04; F24J 2/407; A47C 21/048; A47J 2202/00; A47J 27/18; A47J 36/24

USPC ................ 359/288, 242; 436/147; 422/82.12; 252/299.01, 586; 374/121, 141, 142, 374/E15.001, 1, 131; 430/7; 349/20, 106, 349/168, 182, 188, 56; 73/61.76; 116/207

See application file for complete search history.

(56) References Cited

U.S. PATENT DOCUMENTS

| | | | | |
|---|---|---|---|---|
| 5,805,245 | A * | 9/1998 | Davis ............................... | 349/20 |
| 6,580,413 | B1 * | 6/2003 | Walsh ............................. | 345/105 |
| 6,783,368 | B2 * | 8/2004 | Prasad et al. .................. | 434/276 |
| 8,353,069 | B1 * | 1/2013 | Miller ............................. | 5/423 |
| 2003/0109908 | A1 * | 6/2003 | Lachenbruch et al. ......... | 607/96 |
| 2005/0034241 | A1 * | 2/2005 | Prince et al. ................... | 5/690 |
| 2005/0262636 | A1 * | 12/2005 | Schmidt ......................... | 5/636 |
| 2007/0088410 | A1 * | 4/2007 | Chung et al. .................. | 607/91 |
| 2011/0035878 | A1 * | 2/2011 | Rouse ............................. | 5/417 |

FOREIGN PATENT DOCUMENTS

WO    2012118980 A1    9/2012

* cited by examiner

*Primary Examiner* — Thoi Duong
(74) *Attorney, Agent, or Firm* — Cantor Colburn LLP

(57) ABSTRACT

A thermally activated display with a temperature management feature and a cover comprising a thermochromic material generally changes from a first color to a second color. The temperature management feature can be a mattress and has a top surface. The cover is substantially flush with the top surface.

17 Claims, 2 Drawing Sheets

THERMALLY ACTIVATED MATTRESS COVER AND DISPLAY

BACKGROUND

The present disclosure generally relates to a thermally activated display and more particularly, to a visual display for indicating effectiveness of a temperature management feature in a mattress or mattress material.

Mattresses with temperature management features, such as phase change materials, ventilated mattress features (e.g. air-cooled technology), and the like, are generally known in the art. One of the problems associated with these mattresses is the inability to demonstrate effectiveness, compared to a mattress without such features, to an individual at the point of sale. Proving usefulness to a customer in the brief interaction occurring during the shopping or purchase process, which can be less than two minutes, can be challenging.

Thermal imaging (TI) photography offers a solution for validating effectiveness or utility of temperature controlling technologies in mattresses. Unfortunately, however, TI cameras can be expensive. In addition, effective utilization entails training, skill, and experience. Furthermore, TI photography can be impractical because it requires an employee or salesperson to continuously acquire images.

Accordingly, there is a need for a convenient, low cost visual display at the point of sale for demonstrating functionality of a temperature management feature in a mattress. It is to solving this need the present disclosure is directed.

SUMMARY

The present disclosure is directed to a thermally activated display with a temperature management feature and a cover including a thermochromic material. In one embodiment, the thermochromic material generally changes from a first color to a second color. Further, the display has a top surface, and the cover is substantially flush with the top surface.

In another embodiment of the present disclosure, a thermally activated display includes a first portion and a cover. The first portion includes a foam having a temperature management feature, and the cover includes a thermochromic material changing from a first color to a second color. Further, the display has a top surface, and the cover is substantially flush with the top surface. The display can include a second portion comprising a foam and being free of the temperature management feature.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present disclosure. It is important, therefore, that the claims be regarded as including such equivalent constructions insofar as they do not depart from the spirit and scope of the present disclosure.

Other advantages and capabilities of the invention will become apparent from the following description taken in conjunction with the accompanying drawings showing embodiments of the present disclosure.

BRIEF DESCRIPTION OF THE SEVERAL VIEWS OF THE DRAWINGS

The foregoing and other novel features of the invention will be better understood upon a reading of the following detailed description taken in conjunction with the accompanying drawings wherein.

DETAILED DESCRIPTION

The present disclosure is generally directed to a thermally activated display. The display includes a temperature management feature and a cover comprising a thermochromic material. The cover may include one or more layers, wherein at least one of the layers comprises the thermochromic material. The temperature management feature can be a mattress or portion of a mattress. The display has a top surface, and the cover is substantially flush with the top surface of the mattress. The thermochromic material in the cover changes from a first color to a second color to provide a visual change to an observer. As described below, the display can be used at the point of sale for indicating functionality and benefits association with the temperature management feature. For example, the thermochromic material can be configured to demonstrate that a temperature management feature provided by a display such as a mattress dissipates heat more effectively than a conventional mattress without the temperature management feature.

As used herein the term "mattress" generally means a structure that can support a body, or one or more portions of a structure that can support a body. Mattresses include commercially available mattresses, foams, supports, and the like. The mattress can be a full body support structure.

As used herein the terms "thermochromic" or "thermally activated" generally refers to a property of changing color when temperature increases or decreases. Therefore, thermochromic materials are materials that change their absorption, and hence their visible color, in response to a change in temperature, wherein the magnitude of the change to effect a color change is not intended to be limited. Suitable thermochromic materials include pigments, inks, dyes, and the like.

As used herein the term "thermally activated display" generally refers to visual display including a thermochromic material for demonstrating functionality of a temperature management feature. The display can include at least one mattress, at least one mattress portion, or at least one mattress material.

As used herein the term "temperature management feature" generally means a feature, material, technology, or component that has an effect on temperature. For example, the temperature management feature can be a component of a mattress or portion of a mattress.

As used herein the term "fiber" generally means a material in which the length to diameter ratio, i.e., aspect ratio, is greater than about 10. The fibers can include "synthetic fibers", "natural fibers", or combinations thereof. "Synthetic fiber" and like terminology refer to fiber made from synthetic polymers such as polyesters, nylons and polyolefins and so forth. The term "natural fiber" generally refers to any cellulosic fiber, wood fiber, non-wood fibers, pulp-derived fiber or mixtures thereof. The terms "cellulosic", "cellulosic fiber" and the like are meant to include any fiber incorporating cellulose as a major constituent.

Figure 1:
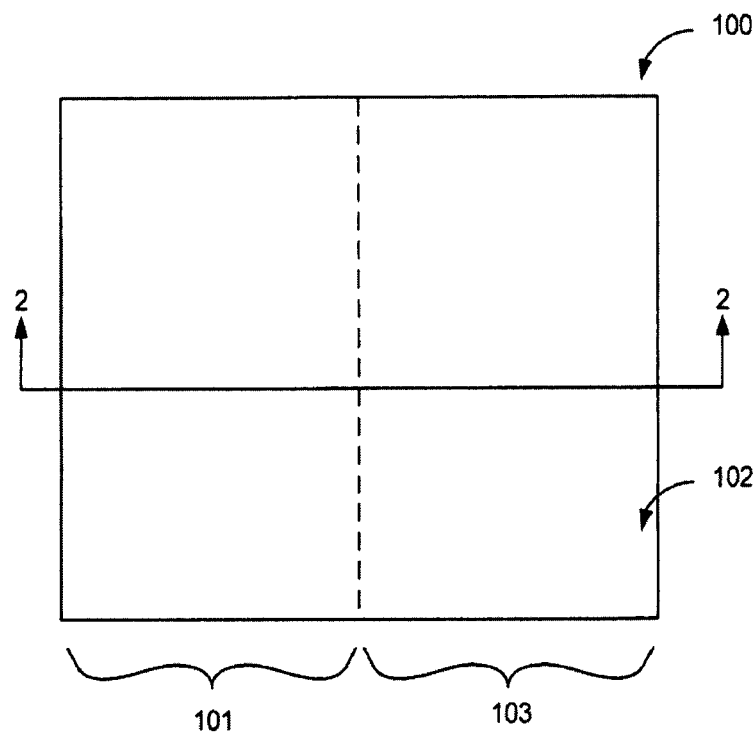
FIG. 1 is a top view of a thermally activated display constructed in accordance with the present disclosure.
Figure 2:
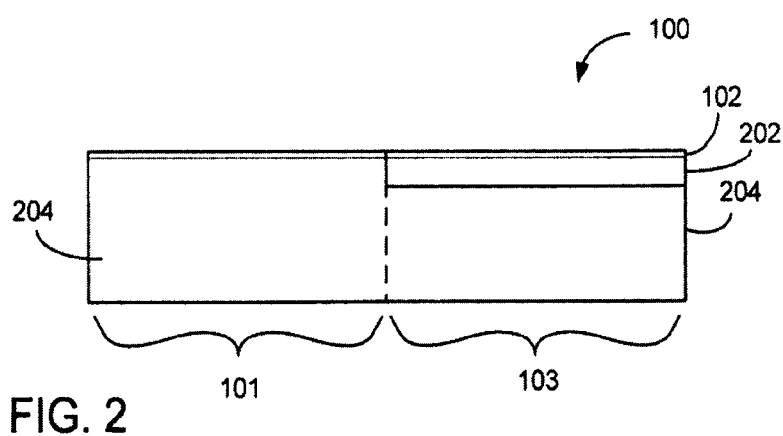
FIG. 2 is a side view of a thermally activated display shown in FIG. 1.

Referring now to the drawings, and initially to FIGS. 1-2, a thermally activated display is designated generally by the reference numeral 100. FIG. 1 demonstrates a top view of the thermally activated display 100, and FIG. 2 demonstrates a side view of the thermally activated display 100 of FIG. 1. In one embodiment, display 100 includes a cover 102 and a first portion 103 having a temperature management feature 202. In another embodiment, the display 100 includes a first portion 103 comprising a temperature management feature 202 and a second portion 101 without a temperature management feature. Yet, in another embodiment, the display 100 only includes first portion 103.

As seen in FIG. 2, the display 100 has a top surface, and the cover 102 is substantially flush with the top surface the display 100. In one embodiment, as shown in FIGS. 1 and 2, the cover 102 can be substantially flush with and cover the entire top surface of the display 100. In another embodiment, not shown in FIG. 1 or 2, the cover 102 can be substantially flush with and cover only a portion of the display 100. The cover 102 can include one or more layers, wherein at least one layer includes a thermochromic material configured to change from a first color to a second color upon detecting a change in temperature. In other embodiments, the thermochromic material may change from a first color to one or more colors as the material cools. The cover 102 can be removable. Alternatively, the cover 102 can be sewn, attached or fixed to the display during manufacture. By way of example, in mattress display applications, the cover 102 can be an internal or external layer of the ticking (i.e., the protective layer that encases the mattress) and/or quilt layers and/or mattress toppers.

In another embodiment, referring now to FIG. 2, display 100 includes a first portion 103 having a temperature management feature 202 proximal to the mattress top surface, and optionally, disposed on top of support 204. Support 204 can be any type of mattress structure, support, foam or material being free of temperature management feature 202. Further, display 100 includes a second portion 101 free of the temperature management feature 202 as shown. Support 204 of the first portion 103 can be the same or different as the second portion 101.

The temperature management feature 202 is configured to heat, cool, or influence the temperature of the display 100. Further, the temperature management feature 202 can be located in any region of the display 100 and is not restricted to the top surface. For example, mattresses with temperature management features that actively or passively heat, cool, or control the mattress surface temperature can be desirable for achieving the ideal temperature for an individual, which promotes restful sleep. Because the temperature of a conventional mattress can increase from body heat throughout the night, some mattresses are designed with features to dissipate the body heat from the surface. Examples of temperature management features include, but are not limited to, phase change materials, ventilated mattress constructions, foams, air circulatory systems, and the like.

The temperature management feature 202 can also include any phase change material. Phase change materials are generally known in the art and have the capability of absorbing or releasing thermal energy to reduce or eliminate heat transfer at the temperature stabilizing range of the particular temperature stabilizing material. When heated, e.g. by a human body or a heating element, the phase change material undergoes a phase change. For example, the phase change can be configured to provide a transition from solid state to liquid state, occurring following absorption of body heat, thereby reducing the temperature increase in the mattress itself.

The temperature management feature 202 can also include any ventilated mattress construction. Ventilated mattress constructions, e.g., can include a plurality of holes, depressions, or ventilation means. A plurality of ventilation holes promote cooling of the mattress surface temperature.

Although temperature management features of mattresses are well-known in the art, difficulty arises in conveying the functionality and benefits of such features to a customer during the mattress purchase process. While shopping for a mattress, a customer only may spend a few seconds to a few minutes assessing the suitability of any particular mattress. Thus, a means of quickly demonstrating the effectiveness of a certain mattress feature in a mattress display compared to other numerous options is essential in successful sales.

The present disclosure addresses and solves the aforementioned problem by incorporating a readily decipherable visual cue into the top cover 102 of the display 100. By incorporating a thermochromic material into the cover 102, the ability of the temperature management feature 202 to influence or control the temperature when an individual lays on the surface, or when heat is applied with a heating element, can be evident within seconds to minutes, depending on the type of thermochromic material selected.

Figure 3:
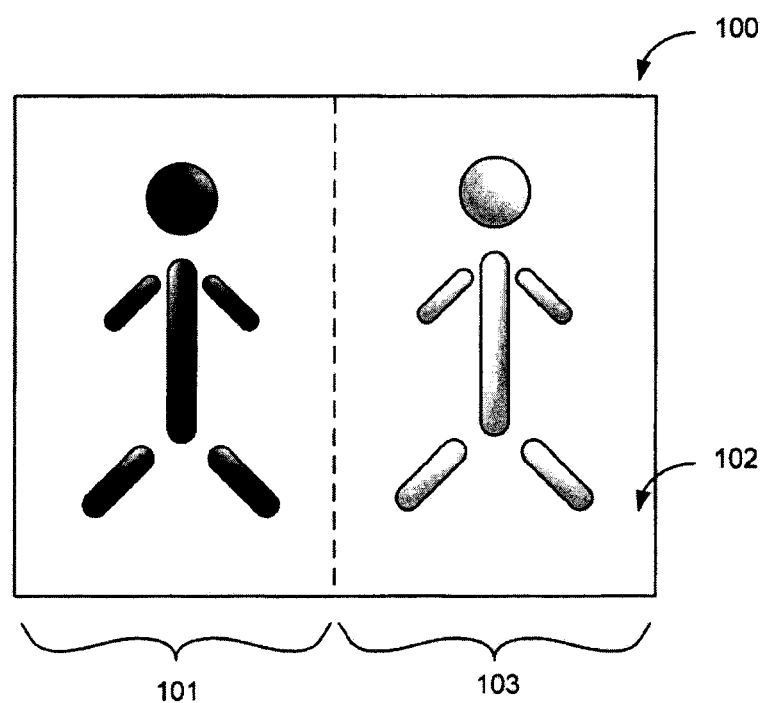
FIG. 3 is a top view a thermally activated display, demonstrating the thermochromic material of the cover changing from a first color to a second color.

When an individual lies on display 100, or when heat is applied with a heating element, the thermochromic portion of the cover 102 will change from a first color to a second color upon detecting a change in temperature. As shown in FIG. 3, when display 100 includes a first portion 103 having a temperature management feature 202 and a second portion 101 without a temperature management feature, the second color of the thermochromic material in contact with the portions may be different because of the difference in temperature. For instance, the absorbed temperature above second portion 101 may be different than the absorbed temperature of first portion 103 with the temperature management feature 202 that is configured to dissipate heat, for example. When first portion 103 incorporates a cooling feature, the temperature of the perceived temperature above will be lower than the temperature of the thermochromic portion of the second portion 101. Thus, a consumer shopping for a mattress will be able to quickly visualize the difference in temperatures of a mattress incorporating a temperature management feature and a conventional mattress without the temperature management feature. In addition, the attractive and unique color changing feature of the display may draw considerable attention from customers.

In one embodiment, a thermally activated display 100 comprises a first portion 103 comprising a foam including a temperature management feature and a cover 102. The cover 102 comprises a thermochromic material changing from a first color to a second color. The display has a top surface and the cover 102 is substantially flush with the top surface. The display can include a second portion 101, which can be a foam being free of the temperature management feature. First portion 103 and second portion 101 can be any size. The display can further comprise a box, with first portion 103 and second portion 101 being housed inside the box. Cover 102 can be disposed on top of the foam portions and can be a film comprising a thermochromic material. An individual can apply heat to the cover 102 by touching or rubbing the cover 102 to demonstrate the different cooling, or heating, effects of the different foams. The display can further include a heating element that increases the temperature of the display, demonstrating a visual color change when the thermochromic material reaches a threshold temperature. The threshold temperature depends on the type of thermochromic material selected.

In the present disclosure, the cover 102 can be constructed of any materials, fibers, films, or blends which are compatible with the selected thermochromic material, which is described below in detail. The cover 102 can comprise synthetic fibers, semi-synthetic fibers, natural fibers, or combinations thereof.

Synthetic fibers can include a thermoplastic. Polyesters are generally obtained by known polymerization techniques from aliphatic or aromatic dicarboxylic acids with saturated aliphatic or aromatic diols. Preferred aromatic di-acid monomers are the lower alkyl esters such as the dimethyl esters of terephthalic acid or isophthalic acid. Typical aliphatic dicarboxylic acids include adipic, sebacic, azelaic, dodecanedioic acid or 1,4-cyclohexanedicarboxylic acid. The preferred aromatic dicarboxylic acid or its ester or anhydride is esterified or trans-esterified and polycondensed with the saturated aliphatic or aromatic diol. Typical saturated aliphatic diols preferably include the lower alkane-diols such as ethylene glycol. Typical cycloaliphatic diols include 1,4-cyclohexane diol and 1,4-cyclohexane dimethanol. Typical aromatic diols include aromatic diols such as hydroquinone, resorcinol and the isomers of naphthalene diol (1,5-; 2,6-; and 2,7-). Various mixtures of aliphatic and aromatic dicarboxylic acids, and saturated aliphatic and aromatic diols, can also be used. Most typically, aromatic dicarboxylic acids are polymerized with aliphatic diols to produce polyesters, such as polyethylene terephthalate (terephthalic acid+ethylene glycol). Additionally, aromatic dicarboxylic acids can be polymerized with aromatic diols to produce wholly aromatic polyesters, such as polyphenylene terephthalate (terephthalic acid+hydroquinone). Examples of polyesters include: polyethylene terephthalate; poly(1,4-butylene) terephthalate; and 1,4-cyclohexylene dimethylene terephthalate/isophthalate copolymer. Other polyesters include linear homopolymer esters derived from aromatic dicarboxylic acids, including: isophthalic acid; bibenzoic acid; naphthalene-dicarboxylic acid; 1,5-; 2,6-; and 2,7-naphthalene-dicarboxylic acids; 4,4,-diphenylene-dicarboxylic acid; bis(p-carboxyphenyl) methane acid; ethylene-bis-p-benzoic acid; 1,4-tetramethylene bis (p-oxybenzoic) acid; ethylene bis(p-oxybenzoic) acid; 1,3-trimethylene bis(p-oxybenzoic) acid; and 1,4-tetramethylene bis(p-oxybenzoic) acid; and diols selected from the group consisting of 2,2-dimethyl-1,3-propane diol; cyclohexane dimethanol; and aliphatic glycols of the general formula $HO(CH_2)_nOH$ where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula $HO(CH_2CH_2O)_nH$ where n is an integer from 2 to 10,000, and aromatic diols such as hydroquinone; resorcinol; and the isomers of naphthalene diol (1,5-; 2,6-; and 2,7). The polymers can include one or more aliphatic dicarboxylic acids, such as adipic, sebacic, azelaic, dodecanedioic acid, or 1,4-cyclohexanedicarboxylic acid.

Nylon or polyamide fibers can be produced by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycapro lactam (nylon 6), polylauric lactam, poly-11-aminoundecanoic acid, and copolymers of adipic acid, isophthalic acid, and hexamethylene diamine.

Suitable polyolefin fiber material can be made by polymerizing olefins such as ethylene, propylene, 1-butene, 1-pentene, 4-methylpent-1-ene, etc., in a conventional manner. Useful polyolefins for fibers are high-density polyethylene (HDPE) and polypropylene. Other polyolefin homopolymers and copolymers of ethylene can be utilized. Such other polyolefins include low-density polyethylene (LDPE), very low-density polyethylene (VLDPE), linear low-density polyethylene (LLDPE) and polybutylene (PB). These polyolefins can be blended with other polyolefins, such as polypropylene or high-density polyethylene (HDPE).

Suitable nonwood fibers include cotton or cotton derivative fibers, abaca fibers, kenaf fibers, sabai grass fibers, flax fibers, esparto grass fibers, straw fibers, jute hemp fibers, bagasse fibers, milkweed floss fibers, and pineapple leaf fibers. Suitable wood fibers, such as those obtained from deciduous and coniferous trees, include softwood fibers, such as northern and southern softwood Kraft fibers, and hardwood fibers, such as eucalyptus, maple, birch, aspen, or the like. Papermaking fibers used in connection with the invention include naturally occurring pulp-derived fibers, as well as reconstituted cellulosic fibers, such as lyocell or rayon. Pulp-derived fibers are liberated from their source material by any one of a number of pulping processes familiar to one experienced in the art including sulfate, sulfite, polysulfide, soda pulping, etc. The pulp can be bleached if desired by chemical means including the use of chlorine, chlorine dioxide, oxygen, alkaline peroxide and so forth. Naturally occurring pulp-derived fibers are referred to herein simply as "pulp-derived" papermaking fibers. The cover can include a blend of conventional fibers (whether derived from virgin pulp or recycled sources) and high coarseness lignin-rich tubular fibers, such as bleached chemical thermomechanical pulp (BCTMP). Pulp-derived fibers thus also include high yield fibers such as BCTMP, as well as thermomechanical pulp (TMP), chemithermomechanical pulp (CTMP) and alkaline peroxide mechanical pulp (APMP).

The thermochromic material of cover 102 can include any type of material that changes from a first color to a second color with a change in temperature, for example a pigment, a dye, or an ink. The first color can be colorless, substantially colorless, black, or a visible color. In addition, the second color can be colorless, substantially colorless, black, or a visible color. As a result, a portion of the cover 102 changes color in response to application of heat, which can occur when an individual lays on the display 100 or upon application of heat from a heating element. When the display comprises small portions of mattresses or mattress materials, heat can be applied with an individual's hand to induce the color change. One or more types of thermochromic materials can be included in the cover 102. In some embodiments, the thermochromic material can change from one color to a variety of different colors as the temperature changes.

The thermally activated displays can further include heating or cooling elements. Heating elements include any apparatus that provides an external source of heat, or can induce the thermochromic material to increase in temperature. Cooling elements include any apparatus that provides an external cooling effect, or can induce the thermochromic material to decrease in temperature. The heating or cooling elements can be incorporated anywhere in the display.

In one embodiment, the thermochromic material is directly incorporated onto/into the fibers the cover 102. In another embodiment, the thermochromic material is applied as a coating by spraying or brushing the cover 102. In some embodiments, some or the entire cover 102 can change color in response to a change in temperature. In other embodiments, the thermochromic material is applied to the cover 102 by typing or stamping, which can be in the form of a logo or text. Optionally, the thermochromic material is mixed with non-thermochromic materials before being dispersed or applied to the cover 102. In some embodiments, the cover 102 is the top fabric panel of a mattress or cushion. In other embodiments, the temperature management feature 202 and cover 102 may both be incorporated in the top fabric panel of a mattress or cushion.

Thermochromic materials can comprise organic or inorganic materials. Organic materials include liquid crystals and leuco dyes. Although liquid crystals can be engineered to change color within an accurate temperature range, the color range is limited. In contrast, leuco dyes allow a wider range of colors to be used. However, their response temperatures are more difficult to set with accuracy.

Some liquid crystals can display different colors at different temperatures. This change is dependent on selective reflection of certain wavelengths by the crystallic structure of the material, for example, as it converts between the low-temperature crystallic phase, through an anisotropic chiral or twisted nematic phase, to the high-temperature isotropic liquid phase. Only the nematic mesophase has thermochromic properties, which restricts the effective temperature range of the material.

In the twisted nematic phase, the molecules are oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers, and therefore in the reflected wavelength. The color of the thermochromic liquid crystal can therefore range from non-reflective color (black) through the visible spectral range, then to black again, depending on the temperature. Typically, the high temperature state will reflect blue-violet, while the low-temperature state will reflect red-orange.

Nonlimiting examples of liquid crystals include cholesteryl liquid crystals, for example cholesteryl nonanoate and cholesteryl cyanobiphenyls. Liquid crystals used in dyes and inks can be microencapsulated, or unencapsulated in the form of suspension. Unencapsulated liquid crystals can provide an enhanced brightness, relative to encapsulated liquid crystals. In absence of encapsulation, the thermochromic material shifts at brighter and more vivid levels.

With an increase in temperature, liquid crystals can change from a non-reflective black first color through a series of visible colors. The second color, as well as subsequent colors, depends on the temperature.

Thermochromic dyes can be based on mixtures of leuco dyes with other suitable chemicals, which display a color change that depends on temperature. The color change can between a colorless leuco form and visible color leuco form. The dyes can be sealed within microcapsules, such as in "hypercolor fashion" or clothing. For example, microcapsules can comprise crystal violet lactone, a weak acid, and a dissociable salt dissolved in dodecanol. When the solvent is solid, the dye exists in its lactone leuco form. However, while when the solvent melts, the salt dissociates, lowering the pH inside the microcapsule. A protonation of the lactone ring then induces a ring opening, shifting its visible absorption and producing a deep violet color.

Nonlimiting examples of thermochromic dyes include spirolactones, fluorans, spiropyrans, and fulgides. Suitable weak acids include bisphenol A, parabens, 1,2,3-triazole derivates, and 4-hydroxycoumarin. Weak acids, as described above, function to lower pH, inducing conversion of the dye molecule from its leuco form and its protonated colored form. Stronger acids, however, could induce an irreversible conversion.

In contrast to liquid crystals, leuco dyes can have less accurate temperature responses. Accordingly, leuco dyes are suitable as general indicators of approximate temperature, for example "cool" or "hot." They can be used in combination with some other pigment, which produces a color change between the color of the base pigment and the color of the pigment combined with the color of the non-leuco form of the leuco dye. Organic leuco dyes of any color can be used in temperature ranges between about −5° C. and 60° C. As in liquid crystals, leuco dyes can be microencapsulated. The size of the microcapsules can range between about 3 µm to 5 µm.

Thermochromic paints can comprise liquid crystals or leuco dyes. In paint applications, the crystallic or molecular structure of the pigment reversibly changes upon absorbing a certain amount of light or heat. Consequently, the liquid crystals or leuco dyes within the paint absorb and emit light at different wavelengths across a temperature range.

Thermochromic materials can include thermochromic papers, such as those used in thermal printers. An example of a thermochromic paper includes a paper impregnated with the solid mixture of a fluoran dye with octadecylphosphonic acid. In the solid phase, the mixture is stable. However, when the octadecylphosphonic acid melts into the liquid phase, the dye is protonated and converted to the colored form. The colored state can be conserved when the matrix re-solidifies, provided the cooling process occurs sufficiently fast.

Thermochromic materials can be first incorporated into or onto thermoplastics, duroplastics, gels, films or any kind of coatings. A thermochromic polymer, an embedded thermochromic additive, or a high ordered structure provided by the interaction of the polymer with an incorporated non-thermochromic additive can be the origin of the thermochromic effect.

Thermochromic materials include substantially all inorganic compounds. The color change derives from changes in electronic properties that are induced by changes in temperature. Some inorganic compounds demonstrate subtle changes in color. For example, titanium dioxide and zinc oxide change from white to yellow upon exposure to heat. Similarly, indium(III) oxide changes from yellow to yellow-brown upon exposure to heat. Lead(II) oxide exhibits a similar color change on heating.

Other inorganic materials, such those that undergo phase transitions or exhibit charge-transfer bands near the visible region undergo, demonstrate more substantial color changes. For example, cuprous mercury iodide ($Cu_2HgI_4$) undergoes a phase transition at 55° C., reversibly changing from a bright red solid material at low temperature to a dark brown solid at high temperature, with intermediate red-purple states. In addition, silver mercury iodide ($Ag_2HgI_4$) is yellow at low temperatures and orange above 47-51° C., with intermediate yellow-orange states. Mercury(II) iodide is a crystalline material which undergoes reversible phase transition from red alpha phase to pale yellow beta phase at 126° C. Bis (dimethylammonium)tetrachloronickelate is a raspberry-red compound, which becomes blue at about 110° C. On cooling, the compound becomes a light yellow metastable phase, which over 2-3 weeks turns back into original red. Bis(diethylammonium)tetrachlorocuprate is a bright green solid material, which reversibly changes color to yellow at 52-53° C. Nickel sulfate is green at room temperature, changing to yellow at 155° C.

Thermochromic materials can include minerals. For examples, some chromium-rich pyropes, normally reddish-purplish, become green when heated to about 80° C.

Thermochromic inks can be incorporated onto/into polymeric materials or fibers as described in International Publication No. WO 2012/118980A1, the disclosure of which is incorporated herein by reference. A variety of thermochromic pigments are available, such as those available commercially from New Prismatic Enterprise Co., Ltd. (Taiwan).

The relative amounts of thermochromic materials can be varied, depending on the desired color intensity. In one embodiment, the first color of the thermochromic material is substantially colorless at a first temperature. Alternatively, the first color of the thermochromic material is a visible color. Upon exposure to a second temperature, the thermochromic material changes to a second color, which can be a visible color, or optionally, substantially colorless.

The temperature change required, which is the difference between a first temperature and a second temperature, to change the thermochromic material from a first color to a second color is defined as the activation temperature. In one embodiment, the activation temperature of the thermochromic material is in a range between about 26° C. to about 29° C. In another embodiment, the thermochromic material changes from a first color to a second color when the mattress temperature decreases by at least about 5° C. Yet, in another embodiment, the thermochromic material changes from a first color to a second color when the mattress temperature increases by at least about 5° C. The thermochromic material can be selected as desired, depending on the color change preferred and established effective temperature change.

Display 100 of the present disclosure can include any type of commercially available mattress or mattress material. Further, display 100 can be any thickness or size. Accordingly, mattress 100 can be manufactured by any methods known to those in the art. In one embodiment, the first portion 103 and second portion 101 are manufactured individually and combined to form display 100.

Display 100 can include a mattress with a pillow top construction, top quilted panel, or foam layer. Optionally, display 100 includes a box spring portion.

The cover 102 can be fixed to the first portion 103 and second portion 101 during manufacture. As described above, cover 102 can be removable for use with another display. Having a removable cover 102 provides versatility and enables the visual display to be easily transferred to any mattress.

With respect to the above description, it is to be realized that the optimum composition for the parts of the invention, to include variations in components, materials, shape, form, function, and manner of operation, assembly and use, are deemed readily apparent and obvious to one skilled in the art, and all equivalent relationships to those illustrated in the example and described in the specification are intended to be encompassed by the present disclosure.

Therefore, the foregoing is considered as illustrative only of the principles of the invention. Further, various modifications may be made of the invention without departing from the scope thereof, and it is desired, therefore, that only such limitations shall be placed thereon as are imposed by the prior art and which are set forth in the appended claims.

What is claimed is:

1. A thermally activated mattress display comprising:
   a mattress comprising a first portion comprising a temperature management feature; and
   a removable fabric cover overlaying the mattress comprising a thermochromic material configured to change from a first color to a second color, the mattress having a top surface and the cover being substantially flush with the top surface.

2. The thermally activated display according to claim 1, wherein the temperature management feature comprises a phase change material.

3. The thermally activated display according to claim 1, wherein the temperature management feature comprises a ventilation feature or a heating feature.

4. The thermally activated display according to claim 1, wherein the thermochromic material has an activation temperature in a range between about 26° C. and 29° C.

5. The thermally activated display according to claim 1, wherein the first color or the second color is substantially colorless.

6. The thermally activated display according to claim 1, wherein the thermochromic material comprises liquid crystals.

7. The thermally activated display according to claim 6, wherein the liquid crystals are cholesteryl liquid crystals.

8. The thermally activated display according to claim 1, wherein the cover is removable.

9. The thermally activated display according to claim 1, wherein the mattress further comprises a second portion free of the temperature management feature abutting the first portion, wherein the cover overlays the first and second portions, and wherein the change from the first color to the second color is different for the first portion with the temperature management feature relative to the second portion without the temperature management feature.

10. The thermally activated display according to claim 9, wherein when in use the first portion exhibits no color change and the second portion exhibits a color change.

11. A thermally activated mattress display comprising:
    a mattress comprising a first portion comprising a foam having a temperature management feature; and
    a removable fabric cover overlaying the mattress comprising a thermochromic material changing from a first color to a second color, the mattress having a top surface and the cover being substantially flush with the top surface.

12. The thermally activated display according to claim 11, the mattress further comprises a second portion abutting the first portion, the second portion comprising a foam free of the temperature management feature, wherein the cover overlays the first and second portions.

13. The thermally activated display according to claim 11, wherein the thermochromic material has an activation temperature in a range between about 26° C. and 29° C.

14. The thermally activated display according to claim 11, wherein the first color or the second color is substantially colorless.

15. The thermally activated display according to claim 11, wherein the thermochromic material comprises liquid crystals.

16. The thermally activated display according to claim 15, wherein the liquid crystals are cholesteryl liquid crystals.

17. A mattress assembly comprising:
    a mattress comprising a first portion having a temperature management feature and a second portion abutting the first portion not having the temperature management feature; and
    a cover overlying the mattress comprising a thermochromic material changing from a first color to a second color in response to a change in temperature, the mattress having a top surface and the cover surface being substantially flush with the top surface, wherein the change from the first color to the second color is different for the first portion with the temperature management feature relative to the second portion without the temperature management feature.

* * * * *